United States Patent [19]

Young

[11] Patent Number: 4,559,076

[45] Date of Patent: Dec. 17, 1985

[54] NITROGEN FERTILIZATION

[75] Inventor: Donald C. Young, Fullerton, Calif.

[73] Assignee: Union Oil Company of California, Los Angeles, Calif.

[21] Appl. No.: 650,563

[22] Filed: Sep. 13, 1984

Related U.S. Application Data

[63] Continuation of Ser. No. 396,739, Jul. 9, 1982, abandoned.

[51] Int. Cl.$^4$ ............................................. C05B 15/00
[52] U.S. Cl. ............................................. 71/29; 71/30; 71/64.07; 71/64.13; 71/902; 71/903
[58] Field of Search ..................... 71/1, 11, 27, 28, 30, 71/64.07, 902, 29

[56] References Cited

U.S. PATENT DOCUMENTS

| | | | |
|---|---|---|---|
| 1,951,518 | 3/1934 | Meiser et al. | 71/9 |
| 1,966,820 | 7/1934 | Jones | 71/9 |
| 3,523,018 | 8/1970 | Geissler et al. | 71/64.07 X |
| 4,033,747 | 7/1977 | Young | 71/30 |
| 4,073,633 | 2/1978 | Young | 71/28 |
| 4,500,335 | 2/1985 | Fenn | 71/28 |

Primary Examiner—Ferris H. Lander
Attorney, Agent, or Firm—Dean Sandford; Gregory F. Wirzbicki; Robert A. Franks

[57] ABSTRACT

Plant nutrient losses from soils due to ammonia volatilization are reduced by the simultaneous application of nitrogen and an additive material which is adsorbed at soil ion exchange sites more readily than is ammonium ion. Useful materials for this purpose include soluble salts of the alkali metals and/or alkaline earth metals.

18 Claims, No Drawings

NITROGEN FERTILIZATION

This application is a continuation of application Ser. No. 396,739, filed July 9, 1982, now abandoned.

BACKGROUND OF THE INVENTION

1. Field of the Invention

The invention relates to soil fertilization with nitrogenous materials, and more particularly to the reduction of ammonia volatilization losses during such fertilization.

2. Description of the Art

Among the chemical fertilizer materials commonly used in agriculture, nitrogen fertilizers are applied in the largest quantities. Most commercial fertilizers contain all, or a large part, of their nitrogen values in the ammoniacal form, e.g., as ammonium sulfate, ammonium nitrate, ammonium phosphate, urea, aqueous ammonia, and the like.

It has long been known that these ammonic fertilizers, when applied to the soil, experience losses of nitrogen content due to the volatilization of ammonia. The losses are significant, particularly when the fertilizer is applied to the surface of the soil, sometimes approaching 100 percent of the originally contained ammonia under the most adverse soil and climatic conditions. Urea has been thought to be particularly susceptible to volatilization loss.

The ammonia volatilization loss problem has been addressed in U.S. Pat. No. 3,232,740 to Sor et al. and U.S. Pat. No. 3,388,989 to Sor. In these patents, the mechanism of loss from urea is shown to involve hydrolysis of urea to ammonium carbonate, under the influence of urease enzyme, and decomposition of the ammonium carbonate into ammonium bicarbonate and free ammonia. Up to about 50 percent of this ammonia is said to be absorbed by soils, with the remainder lost by escape into the air. A partial solution to the problem, according to the patents, lies in deactivating urease with an "inhibitor", such as an organo-urea compound, formaldehyde, or a boron, fluorine or heavy metal compound. By incorporating an inhibitor into urea particles, some reduction in ammonia loss was demonstrated.

Another approach to minimizing the losses is shown in my U.S. Pat. No. 4,073,633, wherein combinations of urea and acid generating compounds are applied to the soil. The acid generators reduce soil pH in the immediate vicinity of the basic urea particles, decreasing the amount of free ammonia which forms and thereby preventing volatilization.

A need remains, however, for a means to reduce the ammonia volatilization from surface-applied fertilizers which is applicable to all ammonic materials, and which does not require inordinately expensive chemical additives. Such means would help to make surface application of solids attractive, for example, in cases where large or inaccessible areas (such as forests) are to be fertilized by aerial application. Also, the surface application of liquid or suspension ammonic fertilizers would be made more feasible if ammonia volatilization could be reduced.

Accordingly, it is an object of the present invention to provide an improved method for the surface application of ammonic fertilizers.

A further object is to provide a method for the surface application of ammonic fertilizer, which reduces the loss of plant nutrient value from ammonia volatilization.

Another object is to provide fertilizer compositions which will not be subject to excessive ammonia volatilization losses when used in surface applications to soils.

These, and other objects, will appear to those skilled in the art, from consideration of the following description and claims.

SUMMARY OF THE INVENTION

The simultaneous application of ammonic fertilizers and a material which is preferentially adsorbed at soil ion exchange sites results in a reduced loss of plant nutrient values from ammonia volatilization. Suitable materials for this purpose include soluble salts of the alkali metals and/or alkaline earth metals.

For solid fertilizers, it is preferred that the additive material be physically combined with the ammonic fertilizer, such as by pelletizing, incorporation within prills or granules, co-precipitation, and the like, in such a manner that segregation will not occur during handling and storage.

Additive material can also be incorporated into liquid ammonic fertilizers by dissolving into solution fertilizers or suspending into suspension fertilizers.

The additives of the invention are used in such amounts that the mole ratio of additive cations to ammonic nitrogen is at least about 0.1, more preferably between about 0.5 and 1.5.

DESCRIPTION OF THE INVENTION

Ammonic fertilizer volatilization losses occur when ammonium salts, applied to the soil, rapidly reach an equilibrium condition with the soil basicity to produce free ammonia. At some soil concentration of ammonium and hydroxide ions, ammonia reaches a concentration which exceeds the retention capacity of the soil and ammonia is subsequently lost to the atmosphere. For this reason, all ammonic fertilizers are subject to ammonia volatilization loss.

The most important factors in the ammonia loss mechanism appear to be: (1) soil pH; (2) actual concentrations of ammonium ion produced in the soil; and (3) the capacity of the soil for retention of ammonia (ability of the soil to retard ammonia diffusion).

Soil pH is primarily a function of the inherent soil composition and is not significantly altered by an application of fertilizer, even when a relatively acidic material such as monoammonium phosphate is applied. In highly alkaline, calcareous soils, the surface application of ammonic fertilizer will always cause a very high ammonia volatilization loss, moderated only by the competing processes of plant assimilation and nitrification (bacterial conversion of ammonium into nonvolatile nitrate), both of which irreversibly remove ammonium ion from the soil environment. If this type of soil also has a high urease activity, the greatest amount of loss would result from the use of urea fertilizer.

Ammonium ion concentration in the soil is established by the rate of application to the soil, the depth of ammonium ion penetration into the soil which occurs prior to soil ammonia fixation, and, in the case of urea, the rate at which urease promotes hydrolysis into ammonium carbonate. It should be apparent that introduction of fertilizer below the soil surface will assist in reducing losses, since free ammonia which forms must diffuse through a greater thickness of soil to reach the atmosphere; a similar effect results from immediately irrigating soil after the surface application of urea fertilizer, so that the urea will be below the surface before significant hydrolysis occurs. In many situations, however, neither subsurface application nor prompt irrigation are feasible. Consequently, the only factor which can be readily controlled is fertilizer application rate.

Once a given concentration of ammonium ion has been established in the soil, the rate of loss depends upon the mobility of the ion in that soil and the rate of ammonia transport from the soil surface (affected by such factors as wind velocity). Soil mobility of ammonium ion is inversely related to the cation exchange capacity of the soil, contributed primarily by its clay content and also by organic acids in the soil. When ammonic fertilizer is applied to the surface of a high-clay soil, the clay adsorbs ammonium ion, in an amount dependent upon the relative concentration of competing cations. Ammonium ions thus immobilized are unable to move into the soil and are therefore more rapidly lost upon conversion to free ammonia.

The cation exchange process is an equilibrium reaction in which all soil cations compete for the immediately available exchange sites. Relative replacing power of cations which are commonly present in the soil at equivalent concentrations is: $NH_4^+ > Mg^{+2} > Ca^{+2} > Na^+$. If ammonium ions enter a soil environment in which the cation exchange capacity is not saturated with other cations, the ammonium will be rapidly fixed near the soil surface.

It has been discovered that the addition of competing cations, simultaneously with fertilization, decreases ammonia volatilization losses, presumably by their occupation of cation exchange sites which would otherwise immobilize ammonium ions near the soil surface. Cations which are suitable for this purpose include those of the alkali metals and alkaline earth metals. Particularly useful cation-containing materials are the salts of lithium, sodium, potassium, magnesium and calcium.

In the practice of this invention, some attention must be given to the nature of the anions present in the ammonic fertilizer and in the salt (or salts) which are used with the ammonic fertilizer. For example, if the soil to be fertilized is dominated by exchangeable calcium and/or magnesium ions, an anion which forms soluble calcium and magnesium salts is desirable, e.g., chloride, nitrate, and the like. If the anions form highly insoluble calcium and magnesium salts, these competing cations will be precipitated in the soil matrix and, therefore, will not be available to occupy exchange sites and reduce ammonia volatilization. In general, where calcium ions predominate, the anions carbonate, phosphate and sulfate should be avoided. For magnesium ions, the anions carbonate and phosphate are not advised.

Since a reduction in ammonia volatilization is probably obtained due to competition of the introduced cations with ammonium ion for available exchange sites, it is necessary to use fairly large amounts of competitive cations to obtain a meaningful reduction in loss of ammonia. In general, the mole ratio of added cation to ammonic nitrogen should be in the range of about 0.1 to about 2, more preferably from about 0.5 to about 1.5, and most preferred at about 1.

In addition to the previously described criteria, the choice of a particular competitive cation will depend somewhat upon the nature of soil to be treated and the type of crop to be grown in that soil. Mixtures of cations are especially useful in this regard, since it will be possible to both reduce ammonia loss and provide other needed plant nutrients (potassium, magnesium, and the like) to counter an existing nutrient deficiency in the soil, while avoiding the buildup of excessive undesirable salinity in the soil. Some soils, for example, contain an excessive amount of sodium ion, so other competitive cations would be chosen for the practice of the invention.

It is preferred that the additive material be physically combined with solid fertilizers for soil application. Due to differences in particle density and size, mixtures of fertilizer and competitive cation salts exhibit intolerable segregation during shipping and storage operations, resulting in very uneven distribution of the materials on soils. As explained previously, it is important in the practice of the invention to provide competitive cations in the immediate vicinity of the ammonic fertilizer, if volatilization loss is to be reduced. Accordingly, the materials can be combined with fertilizer particles by techniques such as pelletizing, agglomeration in the presence of moisture and, in the case particularly of urea, introduction of the additive into a fertilizer melt prior to operations such as prilling, granulation and the like.

Combination of the additive materials with liquid fertilizers is generally somewhat easier. For solution fertilizer, the selected salt or salts can be simply dissolved in fertilizer solution or dissolved and added as a solution to a fertilizer. Of course, specific materials should be chosen so that undesirable chemical reactions (such as precipitation) will not occur in the mixture. Suspension fertilizers containing ammonium-competitive cations can be prepared by methods common in the art; in this instance precipitate formation within the mixture is not necessarily objectionable, so long as the competing cations remain essentially water soluble.

The combined fertilizer-volatilization loss inhibitor will be applied to the soil using any customary equipment and procedure for applying fertilizer alone, since the presence of the additive does not in any significant way affect the handling properties of the original, unmodified fertilizer.

This invention is further illustrated by the following example, which is illustrative of various aspects of the invention, and is not intended as limiting the scope of the invention as defined by the appended claims.

EXAMPLE

A double chamber lysimeter is constructed for measuring ammonia loss, by connecting two 1-liter stoppered Erlenmeyer flasks in series with the outlet of a cylinder of dry air and bubbling the gases exiting the second flask into standardized acid solution. Both flasks contain sufficient soil to provide a soil surface area of 250 square centimeters; the free air volume in each flask is 700 cubic centimeters.

In a particular experiment, fertilizer, or fertilizer containing a competitive cation additive, is applied to the lysimeter soil surface, in maximum concentration aqueous solution, at the rate of 1000 kilograms of ammonic nitrogen per hectare. Air is passed through the lysimeter at the rate of 400 cubic centimeters per hour for 240 hours. By titrating the acid with standard base, the fraction of applied ammonia released from the soil can be calculated from its acid consumption.

Using a calcareous soil, having a high urease activity, results are obtained as follows:

| Fertilizer | Additive Composition | Weight Percent Fert. | Weight Percent Additive | Mole Ratio, Cation to Ammonic Nitrogen | Ammonia Loss, Percent |
|---|---|---|---|---|---|
| Urea | None | 100 | 0 | — | 44 |
| Urea | LiCl | 50 | 50 | 0.71 | 0 |
| Urea | KCl | 50 | 50 | 0.40 | 10.7 |
| Urea | KNO₃ | 50 | 50 | 0.30 | 23.7 |
| (NH₄)₂SO₄ | None | 100 | 0 | — | 21.5 |
| (NH₄)₂SO₄ | LiCl | 69 | 31 | 0.70 | 4.6 |
| (NH₄)₂SO₄ | KCl | 69 | 31 | 0.40 | 9.4 |
| (NH₄)₂SO₄ | KNO₃ | 69 | 31 | 0.29 | 14.8 |

Various embodiments and modifications of this invention have been described in the foregoing description and example, and further modifications will be apparent to those skilled in the art. Such modifications are included within the scope of the invention as defined by the following claims.

What is claimed is:

1. A method for soil fertilization to reduce ammonia volatilization loss, which comprises the simultaneous application to soil of ammonic fertilizer and an additive selected from the group consisting of water soluble compounds of alkali metals, alkaline earth metals, and mixtures thereof, wherein the mole ratio of additive cation to ammonic nitrogen is greater than about 0.1.

2. The method defined in claim 1 wherein said ammonic fertilizer comprises a material selected from the group consisting of urea, ammonium sulfate, ammonium nitrate, ammonium phosphate, aqueous ammonia, and mixtures thereof.

3. The method defined in claim 1 wherein said fertilizer and additive are physically combined in solid particles.

4. The method defined in claim 1 wherein said fertilizer and additive are in the form of an aqueous solution.

5. The method defined in claim 1 wherein said fertilizer and additive are present within an aqueous suspension.

6. The method defined in claim 1 wherein said additive is present in such amount that the applied moles of alkali metal plus alkaline earth metal are from about 0.1 to about 2 times the applied moles of ammonic nitrogen in said fertilizer.

7. The method defined in claim 6 wherein the applied moles of alkali metal plus alkaline earth metal are approximately equal to the applied moles of ammonic nitrogen.

8. The method defined in claim 1 wherein said fertilizer comprises urea and said additive is selected from the group consisting of compounds of lithium, sodium, potassium, and mixtures thereof.

9. The method defined in claim 8 wherein the anionic portion of said additive is selected from the group consisting of chloride, nitrate, sulfate, phosphate, carbonate, bicarbonate, and mixtures thereof.

10. A method for soil fertilization to reduce ammonia volatilization loss, which comprises the simultaneous application to soil of ammonic fertilizer and a water soluble alkali metal compound, in such proportions that the mole ratio of alkali metal to ammonic nitrogen contained within said fertilizer is from about 0.1 to about 2.

11. The method defined in claim 10 wherein said mole ratio is from about 0.5 to about 1.5.

12. The method defined in claim 11 wherein said mole ratio is about 1.

13. A composition which comprises ammonic fertilizer and an additive selected from the group consisting of water soluble compounds of alkali metals, alkaline earth metals, and mixtures thereof, wherein the mole ratio of additive cation to ammonic nitrogen is greater than about 0.1, said fertilizer and additive being physically combined in solid particles.

14. The composition defined in claim 13 wherein said fertilizer comprises urea and said additive comprises a compound selected from the group consisting of lithium chloride, nitrate, sulfate, phosphate, carbonate, bicarbonate, and mixtures thereof, and wherein the mole ratio of lithium to urea nitrogen is from about 0.1 to about 1.5.

15. The composition defined in claim 13 wherein said fertilizer comprises urea and said additive comprises a compound selected from the group consisting of sodium chloride, nitrate, sulfate, phosphate, carbonate, bicarbonate, and mixtures thereof, and wherein the mole ratio of sodium to urea nitrogen is from about 0.1 to about 2.

16. The composition defined in claim 13 wherein said fertilizer comprises urea and said additive comprises a compound selected from the group consisting of potassium chloride, nitrate, sulfate, phosphate, carbonate, bicarbonate, and mixtures thereof, and wherein the mole ratio of potassium to urea nitrogen is from about 0.1 to about 2.

17. An aqueous suspension comprising an ammonic nitrogen material selected from the group consisting of urea, ammonium sulfate, ammonium nitrate, ammonium phosphate, aqueous ammonia, and mixtures thereof, and an additive selected from the group consisting of water soluble compounds of alkali metals, alkaline earth metals, and mixtures thereof, wherein the mole ratio of alkali metal plus alkaline earth metal to ammonic nitrogen is from about 0.1 to about 2.

18. The use of a composition defined in claims 13, or 17 for soil fertilization.

* * * * *